United States Patent
Lewis et al.

(10) Patent No.: US 6,795,806 B1
(45) Date of Patent: Sep. 21, 2004

(54) METHOD FOR ENHANCING DICTATION AND COMMAND DISCRIMINATION

(75) Inventors: James R. Lewis, Delray Beach, FL (US); Kerry A. Ortega, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 330 days.

(21) Appl. No.: 09/665,939

(22) Filed: Sep. 20, 2000

(51) Int. Cl.[7] .......................... G10L 15/00; G10L 15/24
(52) U.S. Cl. ........................ 704/260; 704/270
(58) Field of Search ........................ 704/235, 231, 704/260, 270–271, 275, 277, 278

(56) References Cited

U.S. PATENT DOCUMENTS

| | | | |
|---|---|---|---|
| 5,777,614 A | * 7/1998 | Ando et al. | 345/729 |
| 6,078,310 A | * 6/2000 | Tognazzini | 345/158 |
| 6,351,273 B1 | * 2/2002 | Lemelson et al. | 704/271 |
| 6,393,136 B1 | * 5/2002 | Amir et al. | 382/103 |

FOREIGN PATENT DOCUMENTS

| | | | |
|---|---|---|---|
| EP | 0 702 355 | 3/1996 | G10L/9/20 |
| EP | 0 718 823 | 6/1996 | G10L/9/20 |
| EP | 0 785 540 | 7/1997 | G10L/3/00 |
| WO | WO01/56017 | 8/2001 | G10L/15/26 |

OTHER PUBLICATIONS

Stiefelhagen, R., *Gaze Tracking For Multimodal Human-Computer Interaction*, 1997 IEEE International Conference on Acoustics, Speech and Signal Processing, pp. 2617–2620 (Apr. 21–24, 1997).

* cited by examiner

*Primary Examiner*—David D. Knepper
(74) *Attorney, Agent, or Firm*—Akerman Senterfitt

(57) ABSTRACT

A method for discriminating between an instance of a voice command and an instance of speech dictation can include identifying a focus point in a user interface; defining a surrounding region about the focus point; identifying user interface objects in the surrounding region; further identifying among the identified user interface objects those user interface objects which are configured to accept speech dictated text and those user interface objects which are not configured to accept speech dictated text; computing a probability based upon those user interface objects which have been further identified as being configured to accept speech dictated text and those user interface objects which have been further identified as not being configured to accept speech dictated text; receiving speech input; and, biasing a determination of whether the speech input is a voice command or speech dictation based upon the computed probability. Additionally, the method can include identifying a focus point outside of the user interface; and, biasing a determination of whether the speech input is a voice command or speech dictation based upon a default probability.

4 Claims, 5 Drawing Sheets

METHOD FOR ENHANCING DICTATION AND COMMAND DISCRIMINATION

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition, and more particularly, to a method for enhancing discrimination between and among user dictation, user voice commands, and text.

2. Description of the Related Art

Speech recognition is the process by which an acoustic signal received by microphone is converted to text by a computer. The recognized text may then be used in a variety of computer software applications for purposes such as document preparation, data entry, and command and control. Speech dictation systems further offer users a hands free method of operating computer systems.

In regard to electronic document preparation, presently available speech dictation systems provide user voice commands enabling a user to select a portion of text in an electronic document. Such user voice commands typically employ a syntax such as "SELECT <text>", where the user voice command "SELECT" signals that the text following the command should be selected or highlighted. After a portion of text has been selected, the user can perform any of a series of subsequent operations upon the selected text.

Thus, if a user says, "SELECT how are you", the speech dictation system will search for the text phrase "how are you" within a body of text in the electronic document. Once located in the body of text, the phrase can be selected or highlighted. Subsequently, the user can perform an operation on the selected text such as a delete operation, a bold/italic/underline operation, or a correction operation. In further illustration, once the text "how are you" is highlighted, that user selected portion of text can be replaced with different text derived from a subsequent user utterance. In this manner, users can perform hands-free correction of an electronic document.

Presently, known implementations of the "SELECT" command, or other similar user voice commands for selecting text, suffer from several disadvantages. One such disadvantage is that there may be multiple occurrences of the phrase or word that the user would like to select within a body of text. For example, within a body of text, there are likely to be many occurrences of the word "the". Thus, if the user says "SELECT the", the speech dictation system may not be able to determine which occurrence of the word "the" the user would like to select.

In addressing this problem, conventional speech dictation systems rely upon a system of rules for determining which occurrence of the user desired word or phrase the user would like to select. For example, a speech dictation system can begin at the top of the active window and select the first occurrence of the word or phrase. However, if the user did not want to select the first occurrence of the word or phrase, a conventional speech dictation system can provide the user with the ability to select another occurrence of the word. In particular, some conventional speech dictation systems provide navigational voice commands such as "NEXT" or "PREVIOUS".

By uttering the voice command "NEXT" the user instructs the speech dictation system to locate and select the next occurrence of the desired word or phrase. Similarly, the command "PREVIOUS" instructs the speech dictation system to locate and select the previous occurrence of the desired word or phrase. Although such conventional systems allow the user to navigate to the desired occurrence of a particular word or phrase, users must develop strategies for navigating to the desired occurrence. This can result in wasted time and user frustration, especially in cases where the user perceives the speech dictation system to be inaccurate or inefficient.

Another disadvantage of conventional text selection methods within conventional speech dictation systems is that when searching for the user specified word or phrase, such speech dictation systems typically search the entire portion of a body of text appearing on the user's screen. Each word appearing on the user's screen is activated within the speech dictation system grammar and appears to the speech dictation system as an equally likely candidate. Because the user desires only a single word or phrase, enabling and searching the entire portion of the body of text appearing on the user's screen can be inefficient. Moreover, the technique can increase the likelihood that a misrecognition will occur.

Yet another disadvantage of conventional text selection methods within conventional speech dictation systems is that often it is not readily apparent to the speech dictation system whether a user has uttered a word during speech dictation or a voice command, for example a voice command that activates a drop-down menu. For instance, if a user utters the word "File", depending upon the circumstance, the user could either intend to activate the File menu in the menu bar or insert the word "file" in the electronic document. Accordingly, it is not always apparent to the conventional speech dictation system whether a user utterance is a voice command or speech dictation.

Consequently, although presently available speech dictation systems offer methods of interacting with a computer to audibly command an application, to provide speech dictation in an electronic document and to select text within the electronic document, there remains a need for an improved method of discriminating between user voice commands, user dictations, text, and combinations thereof.

SUMMARY OF THE INVENTION

The invention disclosed herein provides a method and apparatus for discriminating between different occurrences of text in an electronic document and between an instance of a voice command and an instance of speech dictation through the utilization of an eye-tracking system in conjunction with a speech dictation system. The method and apparatus of the invention advantageously can include an eye-tracking system (ETS) for cooperative use with a speech dictation system in order to determine the focus of point of a user's gaze during a speech dictation system. In particular, the cooperative use of the ETS with the speech dictation system can improve accuracy of the "SELECT" user voice command functionality, or any other user voice command for selecting a portion of text within a body of text in a speech dictation system. The use of the ETS in the invention also can improve system performance by facilitating discrimination between user dictation and a voice command.

In accordance with the inventive arrangements, a method for searching for matching text in an electronic document can include identifying a focus point in a user interface and defining a surrounding region about the focus point. Notably, the surrounding region can include a body of text within a user interface object configured to receive speech dictated text. Additionally, the method can include receiving a voice command for selecting specified text within the electronic document and searching the body of text included in the surrounding region for a match to the specified text. Significantly, the search can be limited to the body of text in the surrounding region.

A method for searching for matching text in an electronic document can further include expanding the surrounding region to include an additional area of the user interface if a match to the specified text is not found in the body of text in the searching step. Notably, the additional area included by the expansion can include additional text. Accordingly, the additional text can be searched for a match to the specified text. Finally, as before, the search can be limited to the body of text and the additional text.

In a representative embodiment of the present invention, the expanding step can include expanding the surrounding region outwardly from the focus point by a fixed increment. Alternatively, the expanding step can include expanding the surrounding region by a fixed quantity of text adjacent to the body of text. Finally, the expanding step can include expanding the surrounding region outwardly from the focus point by a variable increment.

A method for discriminating between an instance of a voice command and an instance of speech dictation can include identifying a focus point in a user interface; defining a surrounding region about the focus point; identifying user interface objects in the surrounding region; further identifying among the identified user interface objects those user interface objects which are configured to accept speech dictated text and those user interface objects which are not configured to accept speech dictated text; computing a probability based upon those user interface objects which have been further identified as being configured to accept speech dictated text and those user interface objects which have been further identified as not being configured to accept speech dictated text; receiving speech input; and, biasing a determination of whether the speech input is a voice command or speech dictation based upon the computed probability. Additionally, the method can include identifying a focus point outside of the user interface; and, biasing a determination of whether the speech input is a voice command or speech dictation based upon a default probability.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Utilization of an eye-tracking system (ETS) in conjunction with a speech dictation system can improve the performance of a speech dictation system. Specifically, in accordance with the inventive arrangements, an ETS can assist a speech dictation system in discriminating among multiple occurrences of text within a body of text. Additionally, an ETS can aid the speech dictation system in analyzing speech input to discriminate between voice commands and speech dictation. Such enhancements can be realized by detecting in an ETS the screen location of the focus point of a user's gaze. Advantageously, the screen location, whether on or off screen, can be communicated to the speech dictation system. Based upon the location of the focus point of the user's gaze, a region can be defined about the focus point (referred to as the "surrounding region") which can assist in determining whether speech input is a voice command or speech dictation. Additionally, the surrounding region can be used to identify a specific occurrence of text specified for selection by the user.

Figure 1:
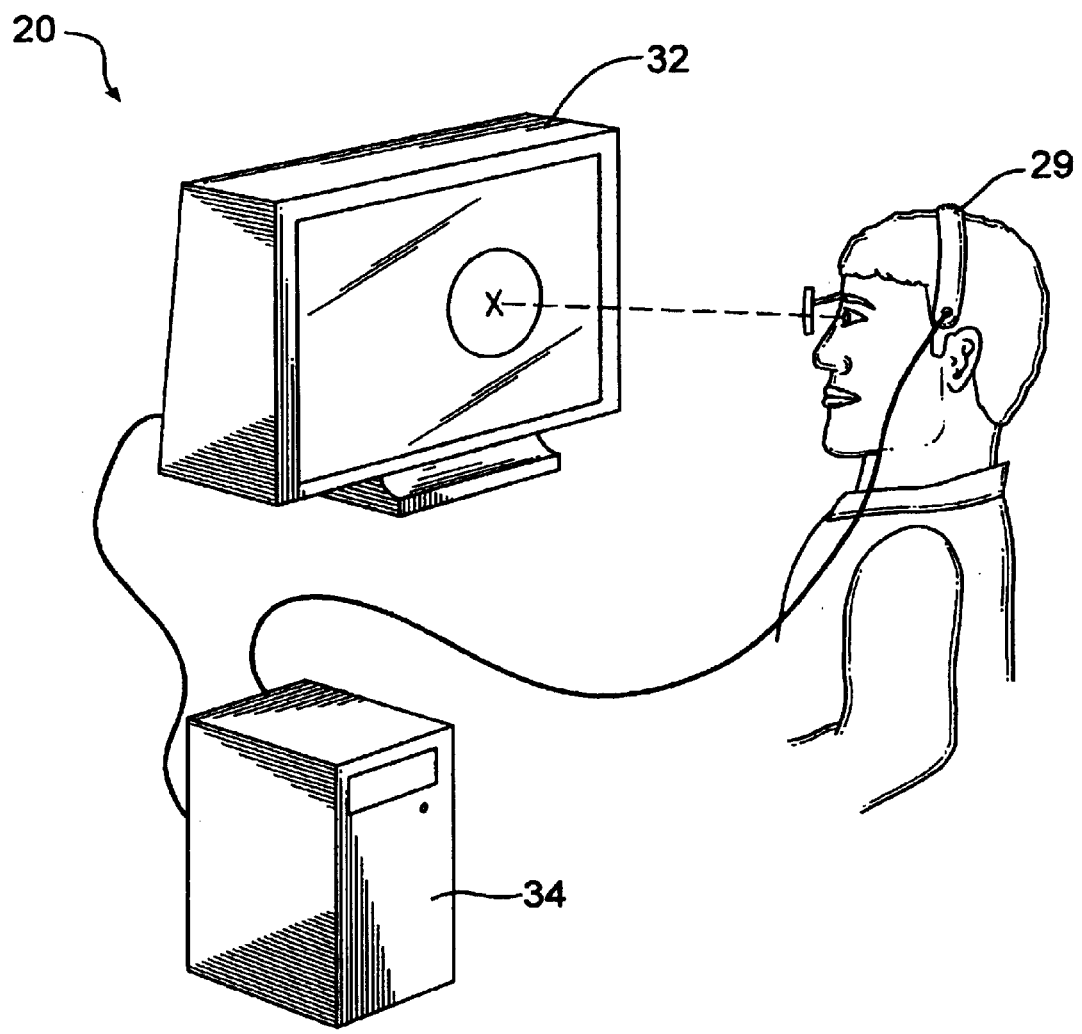
FIG. 1 is an exemplary depiction of a user interacting with the present invention disclosed herein.

FIG. 1 is an exemplary depiction of a user interacting with the invention disclosed herein. In FIG. 1, the user gazes at a location on a video display terminal (VDT) 32. The focus point of the user's gaze is denoted with an asterisk located on the screen of the VDT 32. Also depicted is an ETS having a head-mounted hardware interface 29. ETSs are well known in the art of eye-tracking and measurement. ETSs such as THE EYEGAZE DEVELOPMENT SYSTEM manufactured by LC Technologies, Inc. of Fairfax, Va., as well as EYEMOUSE and EYELINK, both manufactured by SensoMotoric Instruments, Inc. of Boston, Mass. are presently commercially available.

Figure 2:
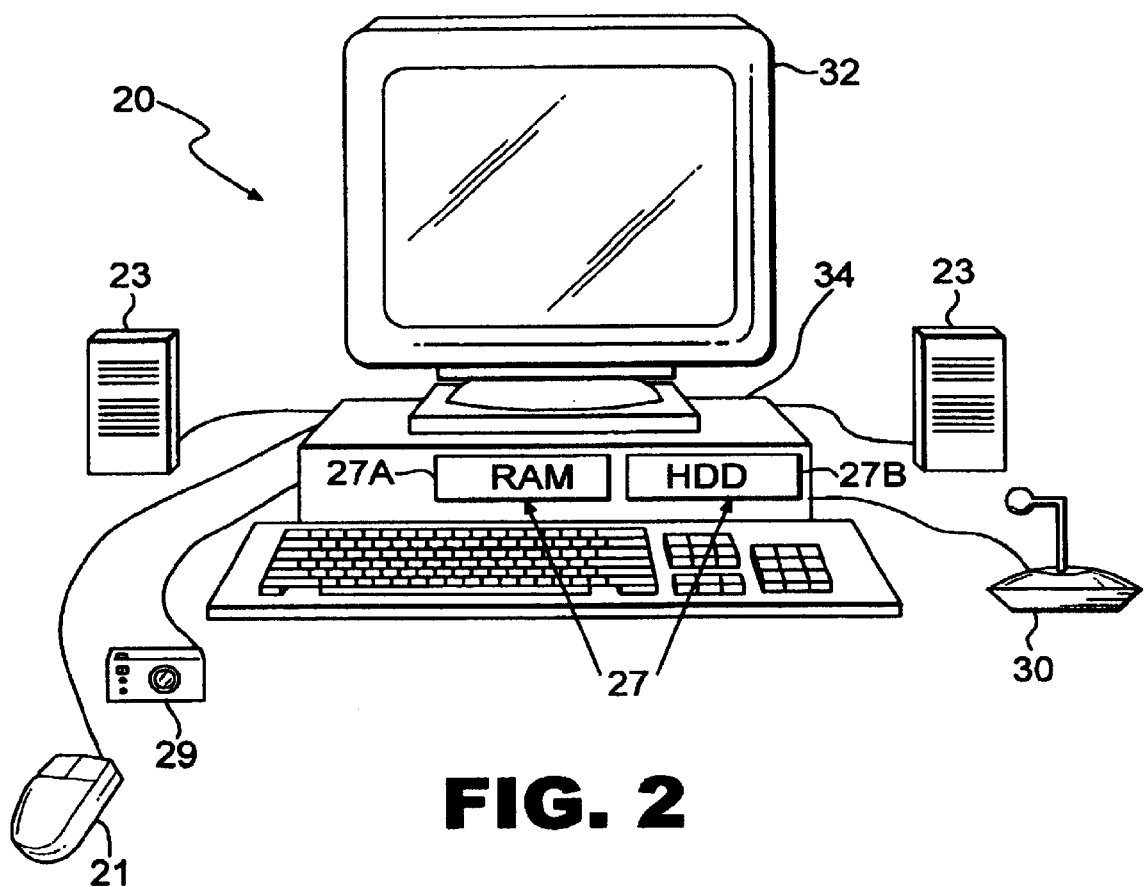
FIG. 2 is a block diagram which illustrates a computer system suitable for use in the present invention.

Configurations for an ETS can include an eye-tracking hardware interface 29, and an image processing system 34. Eye-tracking hardware interface 29 can be a table-top mounted unit as is available from LC Technologies Inc. An exemplary table-top mounted eye-tracking unit is shown in FIG. 2. Alternatively, eye-tracking hardware interface 29 can be a head-mounted unit as is available from SensoMotoric Instruments, Inc. and depicted in FIG. 1. In either case of a table-top mounted unit or a head-mounted unit, eye-tracking hardware interface 29 can communicate information regarding a user's eye to the image processing system 34.

The image processing system can be a stand-alone image processing system, or alternatively exist within a conventional computer. In the case where the image processing system exists within a conventional computer, the conventional computer can utilize a combination of image processing circuitry and image processing software in order to perform the function of an image processing system. It should be appreciated by those skilled in the art that the invention is not so limited by the selected ETS. Rather, any suitable ETS capable of communicating the location of the focal point of a user's gaze to a computer can be employed.

FIG. 2 illustrates the circumstance where the image processing system 34 is a conventional computer based image processing system. In particular, an image processing system 34 can include a conventional computer 20 including a central. processing unit (CPU), one or more memory devices and associated circuitry. The convention computer 20 can include computer memory devices 27, which are preferably comprised of an electronic random access memory 27A and a bulk data storage medium 27B, such as a magnetic disk drive. Finally, the computer 20 can include a pointing device 21, for instance a mouse, and at least one user interface display unit 32 such as a video data terminal (VDT) operatively connected thereto.

Notably, the computer 20 can be configured to perform speech recognition as well as text-to-speech (TTS) conversion. As such, the computer 20 can further include an audio input device 30, for example a microphone. Additionally, the computer 20 can include an audio output device 23, for example speakers. Both the audio input device 30 and the audio output device 23 can be operatively connected to the computer 20 through suitable interface circuitry or "sound board" (not shown). In this way, user speech can be received into the computer 20 through the audio input device 30, and synthesized speech as well as other audio can be provided to the user through the audio output device 23. The various hardware requirements for the conventional computer 20 as described above can generally be satisfied by any one of many commercially available high speed multimedia personal computers such as those offered and manufactured by International Business Machines Corporation.

In accordance with the inventive arrangements, the computer 20 further can include an eye-tracking hardware interface 29 (the table-top variety shown here), operatively connected to computer 20 through a communications port of the computer 20 (not shown) and communicatively linked to the computer 20 through suitable image processing circuitry and software. Specifically, the image processing circuitry and software can determine the location of the focal point of a user's gaze and can communicate the information to computer applications communicatively linked to the image processing software. In the present invention, a speech dictation system can be communicatively linked to the image processing software from which the speech dictation system can receive data indicating the location of the focal point of a user's gaze.

Figure 3:
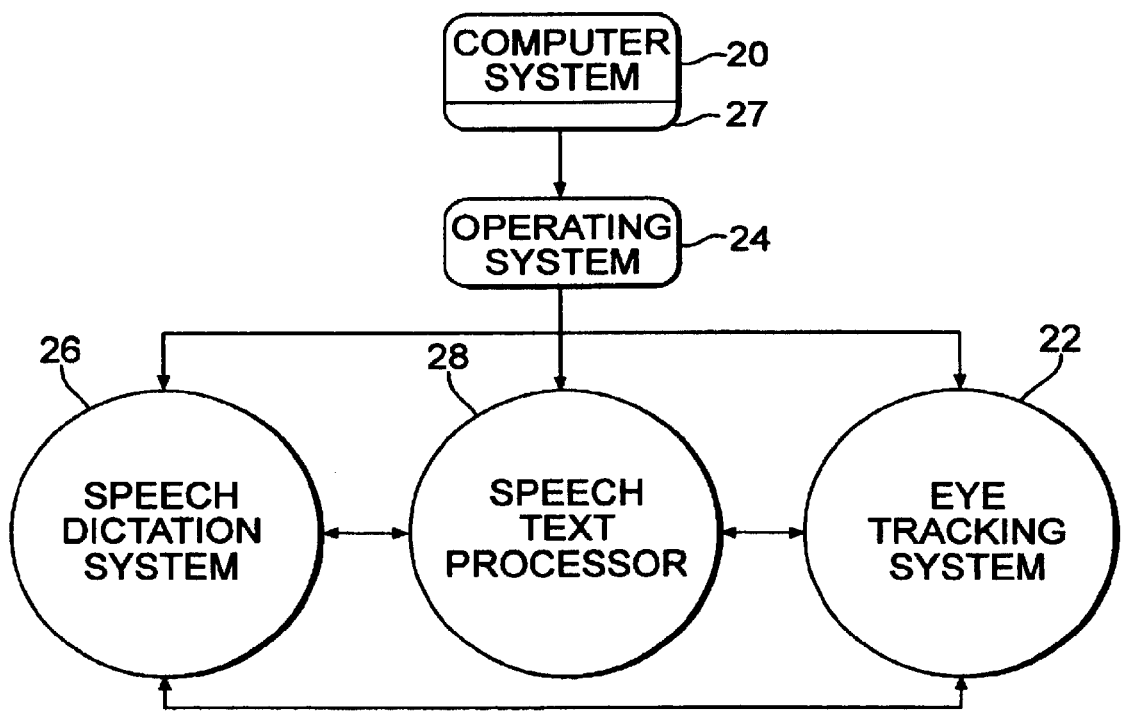
FIG. 3 is a block diagram showing a typical high level architecture for the computer system of FIG. 1.

FIG. 3 illustrates a typical architecture for a speech-enabled computer system incorporating an ETS wherein the computer system is configured to discriminate between different occurrences of text in an electronic document and between an instance of a voice command and an instance of speech dictation. As shown in FIG. 3, the computer system 20 can include in memory storage 27 an operating system 24, a speech dictation system 26 and an eye-tracking system 22. In the example shown, a speech text processor application 28 also is provided. However the invention is not limited in this regard and the speech dictation system 26 can be used with any other application program which is to be voice enabled.

In FIG. 2, the speech dictation system 26, speech text processor 28, and the eye-tracking system 22 are shown as separate application programs. It should be noted however that the invention is not limited in this regard, and these various application programs could be implemented as a single, more complex applications program. For example the speech dictation application 26 could be combined with the speech text processor application 28 or with any other application to be used in conjunction with the speech dictation system. Additionally, the eye-tracking system 22 can exist as an application program contained in computer 20 or alternatively within a standalone ETS capable of communicating with computer 20 via a data link. The system can also include a voice navigator application (not shown) to coordinate the operation of the speech dictation system for voice operation of other applications programs, but is not necessary for operation of the invention as described herein.

Figure 4:
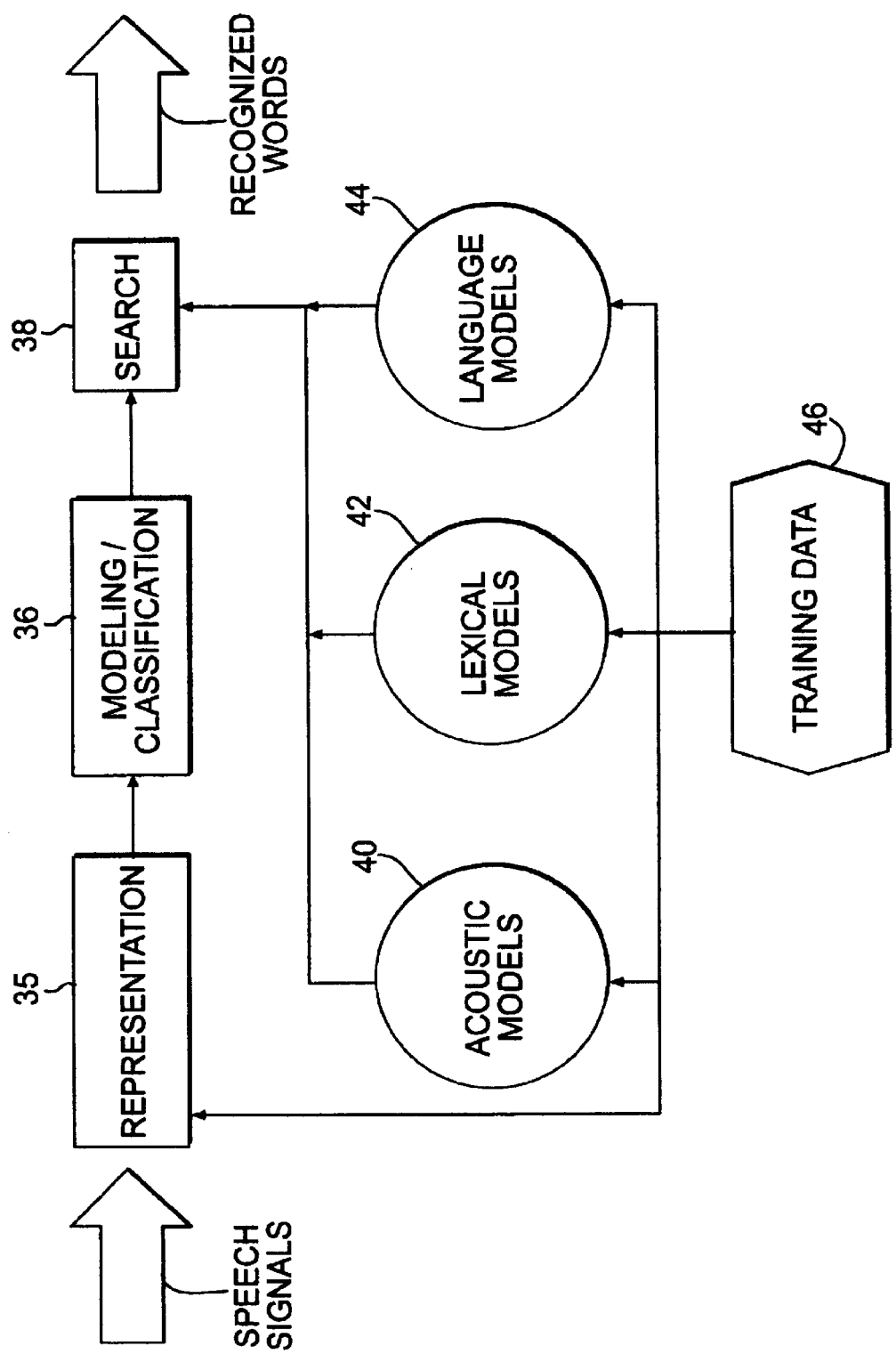
FIG. 4 is a block diagram showing typical components which comprise a speech recognition engine.

FIG. 4 is a block diagram showing typical components which illustrate the speech-to-text conversion of a speech signal in the speech dictation system 26. Typically, analog speech signals can be received through an audio input device as shown in FIG. 2 and processed in audio circuitry into a digitized speech signal. Specifically, the speech signal can be transformed into a digitized set of data by sampling the speech signal at some fixed rate, typically every 10–20 msec. Subsequently, the audio circuitry can communicate the digitized speech signal to the speech dictation system 26.

The representation block 35 can receive the digitized speech signal and can produce a representation of the digitized speech signal which can be used in subsequent stages of the speech recognition process to determine the probability that a portion of speech signal corresponds to a particular phonetic event. This process is intended to emphasize perceptually important speaker independent features of the speech signals received from the operating system.

In the modeling/classification block 36, algorithms can process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42, language models 44 and training data 46.

A method and apparatus for discriminating between different occurrences of text in an electronic document and between an instance of a voice command and an instance of speech dictation in accordance with the inventive arrangements is disclosed herein. The method and apparatus of the invention can include the cooperative use of an ETS in combination with a speech dictation system. Notably, this combination can improve the accuracy of the "SELECT" user voice command functionality, or any other user voice command for selecting a portion of text within a body of text in a speech dictation system. The combination also can improve speech dictation system performance by assisting the speech dictation system in interpreting speech input as either speech dictation or voice command.

The aforementioned enhancements to a speech dictation system can be achieved by computing a probability based upon the detected focus point of a user's gaze that speech input temporally proximate to the user's gaze is one of speech dictation or a voice command. The computed probability can be used to bias the speech dictation system to interpret the speech. input as one of speech dictation or a voice command. Specifically, the speech dictation system can define an adjustable screen region surrounding the detected focus point (the "surrounding region") in consequence of which the speech dictation system can continuously capture and update information pertaining to text and objects located within the surrounding region.

Upon receiving speech input, the speech dictation system can determine whether the surrounding region primarily contains user interface objects or a text input field. If the surrounding region primarily contains a text input field, the speech dictation system can conclude that the speech input should be interpreted as speech dictation for insertion into the text input field. In contrast, if the surrounding region primarily includes user interface objects, the speech dictation system can interpret the speech input as a voice command. Finally, where the speech input is interpreted as a voice command for selecting a text in a body of text in a text input field, the speech dictation system can identify the text to be selected based upon text in the surrounding region rather than the entirety of text in the text input field. In this manner, speech dictation system resources can be more effectively devoted to a smaller region of text, rather than an entire body of text in an electronic document.

Figure 5A:
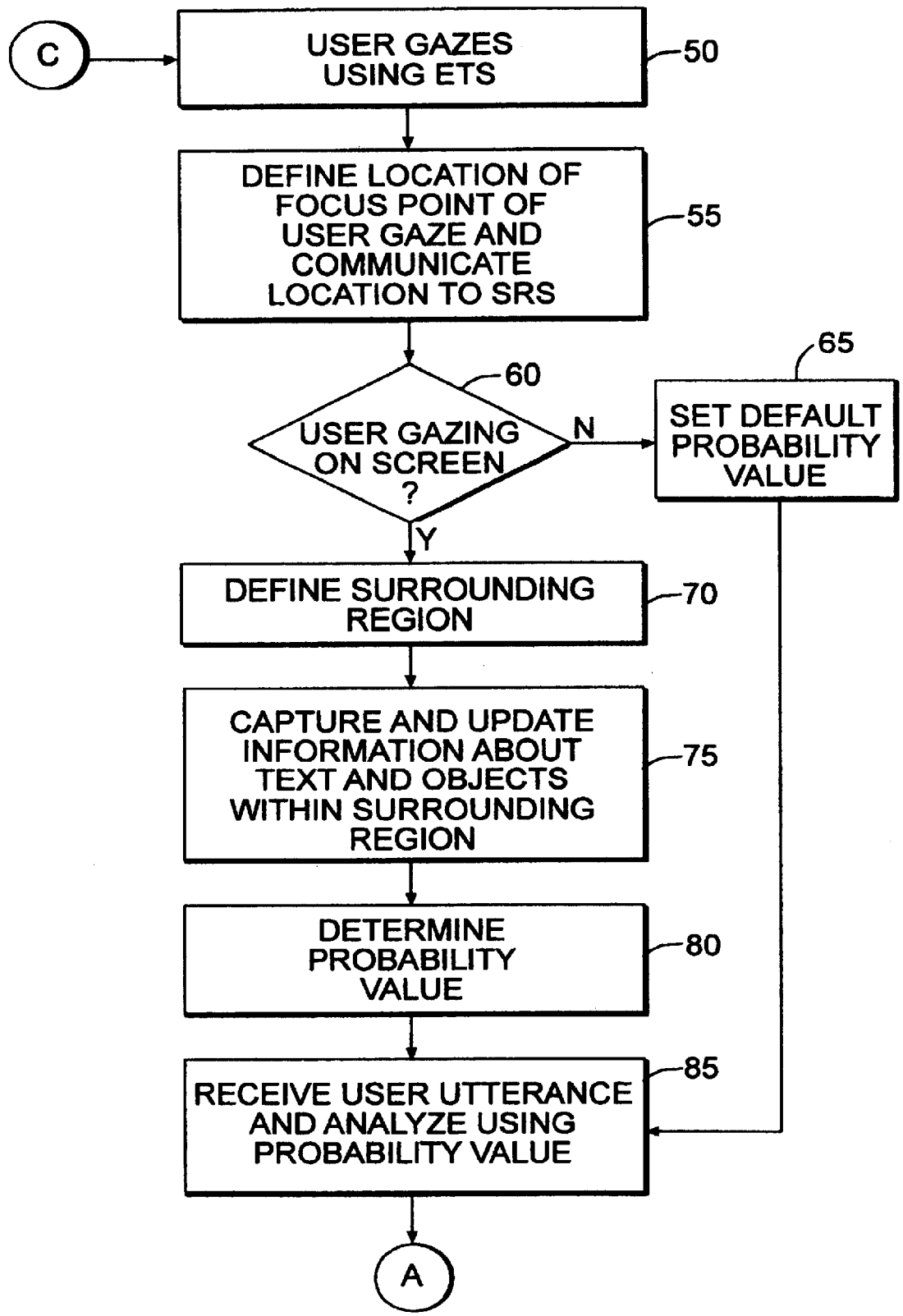
FIGS. 5A and 5B, taken together, constitute a flow chart for illustrating a method for discriminating between different occurrences of text in an electronic document and between an instance of a voice command and an instance of speech dictation through the utilization of an eye-tracking system in conjunction with a speech dictation system.
Figure 5B:
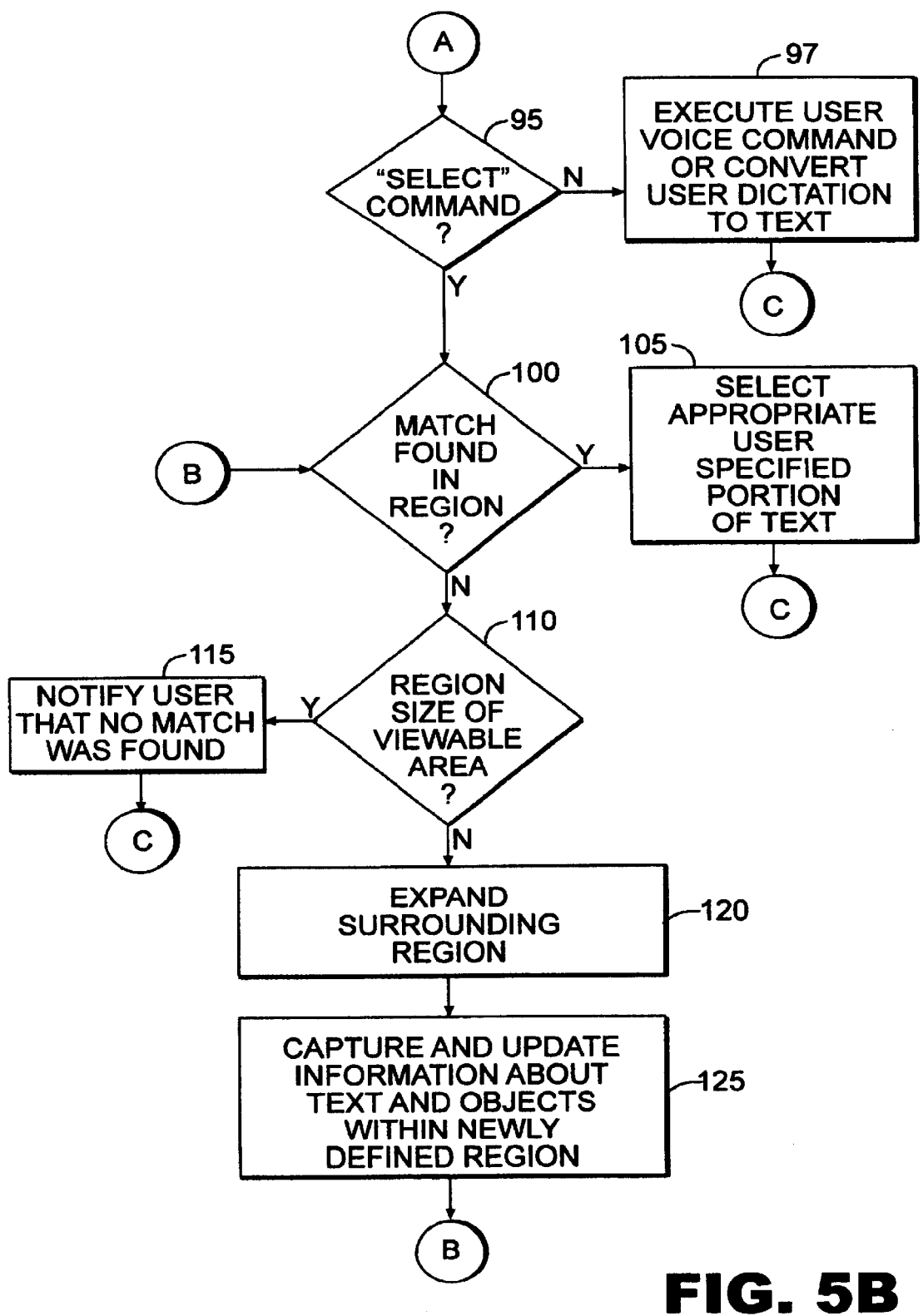

FIGS. 5A and 5B, taken together, constitute a flow chart for illustrating a method for discriminating between different occurrences of text in an electronic document and between an instance of a voice command and an instance of speech dictation. The method can be performed in conjunction with a computer system configured both for the use of a speech dictation system and an ETS. FIG. 5A begins with step 50 wherein the user, while providing speech input to the speech dictation system, naturally gazes at various locations either on the VDT 32 (on screen) or away from the VDT 32 (off screen).

In step 55, the ETS identifies the location of the focus point of the user's gaze. The ETS, with the aid of image processing circuitry and software, determines whether the focus point of the user's gaze is a location on screen or off screen. In any event, the ETS communicates this information to the speech dictation system. In step 60, the speech dictation system has received the location of the user's focus point from the ETS. If the location of the focus point of the user's gaze is on screen then the system proceeds to step 70. If not, then the system continues to step 65.

If in step 60 it is determined that the location of the focus point is on screen, the ETS will have identified the on screen location of the focus point of the user's gaze. Consequently, in step 70, a surrounding region can be defined about the focus point. In one representative embodiment, the surrounding region can be defined by a perimeter according to a specified radius extending outwardly from the focus point. Alternatively, the surrounding region can be defined by overlaying a predetermined geometric area over the focus point.

Still, the invention is not limited to the method for computing the surrounding region. Rather, any suitable method for computing the surrounding region can suffice for the purposes of the present invention. Moreover, it will be appreciated by one skilled in the art that regardless of how the surrounding region is determined or the resulting shape of the surrounding region, the default area or size of the region within an outer perimeter can be a user adjustable value. For example, the user can specify a default area or alternatively, the user can specify a radius in which the surrounding region should extend outward from the focus point.

In step 75, after defining the surrounding region, information concerning text and objects within the region can be captured for use both in determining whether speech input should be interpreted as speech dictation or a voice command, and also in identifying a particular occurrence of specified text in an electronic document. In particular, the captured information can include, for example, the number of pixels dedicated to displaying user interface objects not suitable for receiving speech dictated text and the number of pixels dedicated to displaying user interface objects suitable for receiving speech dictated text. It should be appreciated by defining a limited region in which the speech dictation system can devote its resources, the speech dictation system achieves greater efficiency. For example, the speech dictation system need only activate parts of the speech dictation grammar containing text found within the surrounding region rather than an entire speech dictation grammar.

In step 80, a probability can be computed based upon which speech dictation can be interpreted as a voice command or speech dictation. Specifically, the probability can be computed by calculating a ratio of the dictatable area of the surrounding region as compared to the total area of the surrounding region. For example, if 70% of the surrounding region of can receive user dictation, then the probability is 70% or 0.70. Still, the invention is not limited to the particular manner in which the probability is computed. In fact, other calculations of probability can be based upon, for example, the number of textual or dictated words within the surrounding region as compared to the number of objects within the surrounding region available for user voice commands. Notwithstanding, regardless of how the probability is computed, it should be appreciated that preferably the probability is neither zero nor one indicating a complete certainty that subsequent user utterances will be user dictation or user voice commands. Disallowing such extreme probability values makes possible the situation where the user desires to dictate speech to the speech dictation system while gazing off screen.

If, in decision step 60, it is determined that the focus point of the user's gaze is at a location off screen, in step 65 the system can assign a default value to the probability. This default value is known as the default probability and can be pre-configured by the user. The default probability indicates the statistical likelihood that subsequent speech input is one of speech dictation or a voice command when the user's gaze is off screen. Accordingly, a statistical analysis based upon the default probability can indicate the likelihood of a user intending speech input to be interpreted as speech dictation when the user is looking away from the screen.

The default probability can have an adjustable value ranging from zero (0.00) to one (1.00). Notably, it should be appreciated by those skilled in the art that assigning a high value to the default probability is indicative of the presumption that during speech dictation the user need not look on screen. However, it is preferable that the default probability does not indicate complete certainty that speech input provided when the user is looking away from the screen should be interpreted as either speech dictation or a voice command. Such a certain probability can result in error within the speech dictation system.

In step 85, after either computing a probability or relying on a default probability, speech input can be received. Based on the probability derived with the aid of the ETS, the speech input can be analyzed to determine whether the speech input should be interpreted as speech dictation or a voice command. Subsequently, the method can continue to process the speech input leading through jump circle A to decision step 95 of FIG. 5B.

In decision step 95, it can be determined whether the speech input received in step 85 was a "SELECT" voice command or other similar voice command for selecting text within an electronic document. If the speech input is not interpreted to be the SELECT command, the method proceeds to step 97 wherein one of two actions can occur. First, if the speech input, albeit not the SELECT voice command is determined to be another voice command, the voice command can be executed as would be the case in a conventional speech enabled application. Second, if the speech input is determined to be speech dictation, the speech input can be converted to text by a speech recognition engine. Subsequently, the converted text can be inserted in a user interface object configured to receive the converted text. In either case, the method can return to step 50 of FIG. 5A through jump circle C and the process can be repeated.

Returning to decision step 95, if it is determined that the speech input received in step 85 was a SELECT voice command or other similar voice command for selecting text within an electronic document, in step 100 it can be determined whether text specified by the SELECT command is located in the body of text contained in the surrounding region. For example, if the speech input has been interpreted as the SELECT command, "SELECT mouse", it can be determined whether the body of text contained in the surrounding region includes the word "mouse". If in step 100 a match is found for the specified text, the method can proceed to step 105. Otherwise, the method can continue in step 110.

If a match is found for the specified text in accordance with step 100, in step 105, the most appropriate match for the specified text can be selected. More particularly, if there is only a single match within the body of text in the surrounding region, then the single matched instance of the text can be selected, typically by highlighting the matched occurrence of the text. In contrast, if multiple occurrences of the matched text exist within the body of text in the surrounding region, then it can be determined which instance of the specified text in the body of text in the surrounding region is closest to the focus point. Thus, the focus point of the user's gaze can be used to determine which instance of matched text should be selected. Still, the invention is not limited in this regard and other suitable methods for selecting an instance of matched text among multiple occurrences of matched text can suffice. Such alternative methods can include selecting the first occurrence of matched text in the body of text in the surrounding region.

Once the appropriate occurrence of the specified text has been identified, the identified text can be selected, typically by visually highlighting the text. It should be appreciated that in the case where an incorrect or undesired occurrence of the specified text has been selected, conventional voice commands such as "PREVIOUS" or "NEXT" may be used to navigate to other occurrences of the specified text in the surrounding region. In any event, the method can return to step 50 of FIG. 5A thorough jump circle C to begin the process anew. Thus, by repeating the process, the method can again, compute the surrounding region and determine the probability that subsequently received speech input is speech dictation or a voice command.

Returning now to the decision step 110, if no match is found within the body of text in the surrounding region, it can be determined whether the surrounding region contains all of the viewable user interface which is configured for receiving speech dictation. If so, it can be assumed that no match exists in the body of text on screen and the user can be notified as such in step 115. In another embodiment not depicted in FIG. 5B, where no match exists on screen, the system can provide the user with additional options for continuing and further expanding the search for the user specified text. For example, the user can be queried as to whether the user desires to search the remaining portions of the currently open electronic document. Alternatively, more targeted options can be presented to the user such as expanding the surrounding region by a predetermined or user adjustable number of words or paragraphs before or after the surrounding region. In any case, subsequently, the method can return to step 50 of FIG. 5A through jump circle C to begin the process over again.

In contrast, if in step 100 it is determined that the surrounding region does not contain all of the viewable user interface which is configured for receiving speech dictation, then it cannot be assumed that no match exists in the body of text on screen.

Thus, continuing with step 120, the area covered by the surrounding region can be expanded to include further text. Any suitable method for performing an expansion of the surrounding region can suffice. For example, the outer perimeter of the surrounding region can be extended outward from the user focus point equally in all directions by a predetermined or dynamically computed value. Alternatively, the surrounding region can be expanded outward from the focus point by a predetermined value representing an area measurement.

In one representative embodiment of the present invention, the a default predetermined value can be used for determining the extent of the expansion. The default value can be adjustable in order to provide a fine tuning capability. In this manner a user can specify how much larger the surrounding region should grow during an iteration of the search. Taking the previous example, if the user specified text "mouse" was not found within the body of text in the surrounding region, then the perimeter of the surrounding region can be expanded outwardly from the focus point by one centimeter in all directions. Alternatively, the surrounding region can be expanded by a predetermined area of 5 square centimeters or a particular number of pixels.

Subsequent to the expansion of the surrounding region, in step 125, information pertaining to objects and text within the newly expanded surrounding region can be computed, collected and stored for future use in the method of the invention. Additionally, the new body of text now within the newly expanded surrounding region can be activated within the speech dictation system grammar. Also, attributes of objects existing within the newly expanded surrounding region can be identified. After identifying text and objects within the newly expanded surrounding region, the search for matched text in the body of text can be repeated beginning through jump circle B in step 100. In this manner, the method can systematically and incrementally expand the search for the user specified text within a body of text up to and beyond the on screen portion of the body of text.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method for discriminating between an instance of a voice command and an instance of speech dictation comprising:

identifying a focus point in a user interface;

defining, a surrounding region about said focus point;

identifying user interface objects disposed in a speech-enabled application in said surrounding region;

further identifying among said identified user interface objects those user interface objects which are configured to accept speech dictated text and those user interface objects which are not configured to accept speech dictated text;

computing a probability based upon those user interface objects which have been further identified as being configured to accept speech dictated text and those user interface objects which have been further identified as not being configured to accept speech dictated text;

receiving speech input; and, biasing a determination of whether said speech input is a voice command or speech dictation based upon said computed probability.

2. The method of claim 1, further comprising:

identifying a focus point outside of said user interface; and, biasing a determination of whether said speech input is a voice command or speech dictation based upon a default probability.

3. A machine readable storage having stored thereon a computer program for discriminating between an instance of a voice command and an instance of speech dictation, said computer program having a plurality of code sections executable by a machine for causing the machine to perform the steps of:

identifying a focus point in a user interface;

defining a surrounding region about said focus point;

identifying user interface objects disposed in a speech-enabled application in said surrounding region;

further identifying among said identified user interface objects those user interface objects which are configured to accept speech dictated text and those user interface objects which are not configured to accept speech dictated text;

computing a probability based upon those user interface objects which have been further identified as being configured to accept speech dictated text and those user interface objects which have been further identified as not being configured to accept speech dictated text;

receiving speech input; and, biasing a determination of whether said speech input is a voice command or speech dictation based upon said computed probability.

4. The machine readable storage of claim 3, further comprising:

identifying a focus point outside of said user interface; and, biasing a determination of whether said speech input is a voice command or speech dictation based upon a default probability.

* * * * *